United States Patent
Gaudin

[11] Patent Number: 5,844,011
[45] Date of Patent: Dec. 1, 1998

[54] COMPOSITION AND METHOD FOR SELECTIVELY ABSORBING LIQUID HYDROCARBON FROM A FLOOR OR OTHER HARD SURFACE

[76] Inventor: Raymond J. Gaudin, 203 Medinah, St. Simons Island, Ga. 31522

[21] Appl. No.: 833,735

[22] Filed: Apr. 9, 1997

[51] Int. Cl.⁶ .............................. B08B 7/00; C08G 18/00
[52] U.S. Cl. .............................. 521/122; 134/7; 210/924; 510/144; 510/215; 510/455; 521/918; 523/218; 523/219
[58] Field of Search ................... 521/122, 918; 134/7; 210/924; 510/144, 215; 523/218, 219

[56] References Cited

U.S. PATENT DOCUMENTS

| | | | |
|---|---|---|---|
| 3,698,850 | 10/1972 | Sparlin | 431/8 |
| 3,843,306 | 10/1974 | Whittington et al. | 431/8 |
| 3,862,963 | 1/1975 | Hoshi et al. | 252/428 |
| 4,039,489 | 8/1977 | Fletcher et al. | 260/2.5 |
| 4,142,969 | 3/1979 | Funk et al. | 210/36 |
| 4,151,078 | 4/1979 | Calvin | 210/30 |
| 4,230,566 | 10/1980 | Faudree, III | 210/693 |
| 4,366,067 | 12/1982 | Golding et al. | 210/671 |
| 4,395,357 | 7/1983 | Krämer et al. | 252/428 |
| 4,551,481 | 11/1985 | Smith et al. | 521/122 |
| 4,569,861 | 2/1986 | Smith et al. | 421/122 |
| 4,581,385 | 4/1986 | Smith et al. | 521/122 |
| 5,066,405 | 11/1991 | Liston et al. | 210/693 |
| 5,256,703 | 10/1993 | Hermann et al. | 521/122 |
| 5,423,991 | 6/1995 | Zimmerman et al. | 210/671 |
| 5,466,379 | 11/1995 | Schiwek | 210/680 |

OTHER PUBLICATIONS

Material Safety Data Sheet, FOAMGLAS Insulation.
Material Safety Data Sheet, TRYMER (F) 2000.
Technical Publication, TRYMER #1800 Brand Polyisocyanurate Foam.
Voluntary Floor Safety Compliance Maker Sense, Occuptional Health & Safety.

*Primary Examiner*—Morton Foelak
*Attorney, Agent, or Firm*—Jones & Askew, LLP

[57] ABSTRACT

Method and composition for selectively removing liquid hydrocarbon from floors and other hard surfaces comprising granular polyisocyanurate foam. The composition desirably includes a particulate material having a bulk density greater than the polyisocyanurate foam for increasing the overall bulk density of the composition and imparting slip resistance to the floor or hard surface. Suitable particulate material includes angular sand and comminuted cellular glass. The granular polyisocyanurate foam and particulate material can be supplied from scrap material to reduce cost and landfill waste.

14 Claims, No Drawings

COMPOSITION AND METHOD FOR SELECTIVELY ABSORBING LIQUID HYDROCARBON FROM A FLOOR OR OTHER HARD SURFACE

TECHNICAL FIELD

This invention relates to liquid hydrocarbon spill cleanup, and more particularly relates to the cleanup of liquid hydrocarbon spills, such as oil spills, on floors or other hard surfaces.

BACKGROUND OF THE INVENTION

Liquid hydrocarbon spills present well known hazards. Liquid hydrocarbon as used herein encompasses materials such as oil, gasoline, xylene, toluene, styrene, and the like. Liquid hydrocarbon spills on floors and other hard surfaces create slip and fall hazards, fire hazards, and environmental pollution by vaporizing into the surrounding air or being carried off by water. Accordingly, it is desirable to clean liquid hydrocarbon spills. This is particularly true in view of the potential liability for accidents and ever increasing governmental environmental and safety regulations.

Liquid hydrocarbon spills on floors and other hard surfaces can be cleaned by applying to the liquid hydrocarbon spill an absorbent material or article such as clay, diatomaceous earth, saw dust, rags, nonwoven materials such as polypropylene cloth, cellulosic materials, and the like. Clay and diatomaceous earth are the least expensive and most commonly used materials for absorbing liquid hydrocarbon spills; however, such materials also absorb water which is often present along with liquid hydrocarbon spills. For example, in an automobile repair center or service station where oil spills often occur, the floor conditions are often wet with water because of cleaning or outside weather conditions. Enough clay or diatomaceous earth must be used to absorb both the oil and the water. This results in a large quantity of oil and water-laden absorbent materials which must be disposed of in some manner such as by dumping in a landfill. The additional waste caused by the absorbed water increases the cost of liquid hydrocarbon cleanup by increasing the amount of absorbent material necessary to clean up the spill and increasing the weight and volume of material which eventually must be dumped. The relatively high bulk density of clay and diatomaceous earth compounds this problem. Although some conventional liquid hydrocarbon absorbing materials, such as polypropylene nonwovens, selectively absorb liquid hydrocarbons over water, their cost is excessive for many applications.

Therefore, there is a need for a relatively inexpensive composition for selectively absorbing liquid hydrocarbons over water to clean liquid hydrocarbon spills on floors and other hard surfaces.

SUMMARY OF THE INVENTION

This invention solves the above-described problems in the art by providing a method and composition for selectively removing liquid hydrocarbon, such as oil, from floors and other hard surfaces. Generally described, the composition of this invention includes granular polyisocyanurate foam for absorbing the liquid hydrocarbon. The granular polyisocyanurate foam is oleophillic and hydrophobic and therefore selectively absorbs liquid hydrocarbons over water. The granular composition is applied to liquid hydrocarbon on a floor or other hard surface and, after the composition has absorbed at least a portion of the liquid hydrocarbon, the liquid hydrocarbon-laden composition is removed from the floor or other hard surface, such as by sweeping.

More particularly, the composition of this invention further comprises a particulate material having a bulk density greater than the bulk density of the granular polyisocyanurate foam for increasing the overall bulk density of the composition and for imparting slip resistance to the floor or hard surface to which the composition is applied. By increasing the overall density of the selectively absorbent composition, the composition is less likely to be blown by moving air and is easier to handle. Pure polyisocyanurate foam has a very low bulk density and is easily blown away.

The particulate material is desirably oleophillic and non-water absorptive in the composition and has an angular surface to enhance the slip resistance of the composition and to mechanically engage the granular polyisocyanurate foam. The angular surface of the particulate material causes the particulate material to stick to the polyisocyanurate foam, further enhancing the ability of the particulate material to weigh the polyisocyanurate foam down and prevent wind or other moving air from blowing the selectively absorbent composition.

For example, particularly suitable particulate material for use in the composition of this invention includes angular sand, also known as manufactured sand, and comminuted granular cellular glass. Desirably, the comminuted cellular glass has a particle size such that the cellular glass passes through a 30 mesh screen and the granular polyisocyanurate foam has a particle size such that the polyisocyanurate foam passes through a 16 mesh screen. Preferably, the polyisocyanurate foam is present in the composition in an amount from about 25 to about 75% by weight of the composition and the particulate material is present in an amount from about 75 to about 25% by weight of the composition. In addition, the bulk density of the polyisocyanurate foam is desirably from about 0.5 to about 4.0 lbs./ft.$^3$ and the bulk density of the particulate material is desirably within the range from about 30 to about 50 lbs./ft.$^3$.

Suitable polyisocyanurate foam and particulate material such as cellular glass can be obtained from a variety of sources, but it is economically suitable to use scrap polyisocyanurate foam and cellular glass because scrap materials are available at a relatively low cost. In addition, utilizing scrap or waste materials generally reduces landfill tonnage and cost. This is, of course, economically and socially desirable because it helps reduce an environmental problem.

Other factors contributing to the low cost of the method and composition of this invention are the selective absorptivity of the composition and the low bulk density of the composition. Because this invention absorbs liquid hydrocarbon, but not water, the overall amount of absorptive composition necessary to clean spills containing both liquid hydrocarbon and water is reduced and the volume and weight of used absorptive composition which must be disposed is reduced because no water is absorbed. The relatively low bulk density of the composition of this invention means that the composition, when laden with liquid hydrocarbon, is lighter in weight than conventional liquid hydrocarbon removing materials. Accordingly, the landfill disposal cost of the composition of this invention is less than with conventional products. Furthermore, the slip resistance imparted by the composition of this invention reduces potential liability caused by slips and falls which are a major cause of injury and death.

Accordingly, an object of this invention is to provide an improved method and composition for removing liquid hydrocarbon spills from floors and other hard surfaces.

Another object of this invention is to provide a relatively low cost method and composition for selectively removing spilled liquid hydrocarbon from floors and other surfaces.

Still another object of the present invention is to reduce slip and fall accidents caused by spilled liquid hydrocarbon on floors and other surfaces.

Yet another object of this invention is to reduce landfill waste and the cost of disposing of spilled liquid hydrocarbon.

Other objects, features, and advantages of this invention will become apparent from the detailed description and claims.

DETAILED DESCRIPTION OF EMBODIMENTS OF THE INVENTION

As summarized above, this invention encompasses a composition and method for selectively absorbing liquid hydrocarbon from a floor or other hard surface. Generally described, the composition includes granular polyisocyanurate foam, and according to a particular embodiment, comprises granular polyisocyanurate foam having a first bulk density for absorbing the liquid hydrocarbon and a particulate material having a second bulk density greater than the first bulk density for imparting slip resistance to the floor or hard surface. Bulk density as used herein means the mass of the respective granular or particulate material per unit of volume.

The granular polyisocyanurate foam is very effective to absorb the liquid hydrocarbon, but has little effect on increasing the coefficient of friction of the floor or hard surface. The particulate material added to the granular polyisocyanurate foam is therefore slip resistant to increase the slip resistance of the liquid hydrocarbon absorbing composition. In addition, the particulate material, having a greater bulk density than the bulk density of the granular polyisocyanurate foam, increases the overall bulk density of the composition and increases the force required to move the composition. Practically speaking, the higher density particulate material helps reduce the amount of composition from being blown away during the application by wind or other moving air.

Polyisocyanurate foam is typically formed into buns or sheets for use as insulation. For this invention, the polyisocyanurate foam is desirably comminuted into granules such as by grinding or chopping in a hammermill or a bladed chopper. The polyisocyanurate foam is desirably comminuted into granules having a particle size such that the granules pass through a 16 mesh screen.

Particularly suitable commercially available polyisocyanurate foam is TRYMER polyisocyanurate foam available from the Dow Chemical Company of Midland, Mich.

Although the polyisocyanurate foam granules are a suitable absorbent of liquid hydrocarbon, its low density can make it difficult to handle, particularly in an environment with moving air. Polyisocyanurate foam granules are easily blown and may not reach their target when applied to a liquid hydrocarbon spill. As explained above, a particulate material having a bulk density greater than the bulk density of the polyisocyanurate foam granules can increase the overall bulk density of the liquid hydrocarbon absorbent composition and make the composition easier to apply. The particulate material should also be slip resistant and increase the coefficient of friction of the polyisocyanurate foam, which can reduce slip resistance. More particularly, the particulate material is desirably oleophillic and nonabsorptive to water. In addition, the particulate material desirably has an angular surface which mechanically engages the polyisocyanurate foam granules to add mass to the granular composition and help prevent the composition from blowing away. Suitable particulate material therefore includes abrasive materials such as angular sand, which is also known as manufactured sand, and comminuted granular cellular glass. Angular is used herein to mean an aggregate whose particles possess well defined edges formed at the intersection of roughly planar faces.

Suitable particulate material which is commercially available includes FOAMGLAS cellular glass available from Pittsburgh Corning Corporation of Pittsburgh, Pa. and CELL U FOAM available from ACS Industries of Houston, Tex. Desirably, the cellular glass is comminuted by grinding or chopping such as in a hammermill or a bladed chopper. Preferably, the cellular glass is comminuted to a particle size such that the cellular glass passes through a 30 mesh screen. By comminuting the cellular glass, the performance of the cellular glass in this invention is enhanced, because comminuting increases the percentage of open cells in the cellular glass, thereby increasing the surface area of the cellular glass and increasing the friction value of the glass. Another benefit to the comminuting process is that the amount of entrapped hydrogen sulfide gas, which is an inherent element of cellular glass, is reduced. Furthermore, the comminuted cellular glass has a bulk density of 30 to 50 lbs./ft.$^3$, which is substantially greater than the bulk density of polyisocyanurate foam.

The polyisocyanurate foam and the particulate material such as cellular glass, can be obtained directly from a manufacturer or can be obtained as scrap from industrial or commercial insulation fabricators, or other sources in the marketplace. Using scrap reduces the cost of the composition because the cost of scrap is generally less than the cost of virgin material and also benefits the environment by reducing the amount of polyisocyanurate foam and particulate material which must be disposed. Another low cost advantage of the composition of the present invention is that the composition of the present invention has a lower overall bulk density than conventional liquid hydrocarbon absorbing products such as clays or diatomaceous earth. Accordingly, the composition of the present invention, after absorbing liquid hydrocarbon, has a lower bulk density than conventional liquid hydrocarbon absorbing products and can be disposed of at most landfills at a lower cost.

Desirably, the polyisocyanurate foam is present in the liquid hydrocarbon absorbing composition in an amount from about 25 to about 75% by weight of the composition and the particulate material, such as angular sand or cellular glass, is present in an amount from about 75 to about 25% by weight of the composition. The components can be preweighed and ground or chopped together or can be weighed and ground or chopped separately, then mixed or blended on a weight basis. With either approach, the component should be blended sufficiently to achieve a homogenous blend of the two materials.

The composition of the present invention is useful to absorb liquid hydrocarbon such as oil, gasoline, xylene, toluene, styrene, and the like, or other petroleum products, spilled on a floor or other hard surface. The composition is applied directly to the liquid hydrocarbon on the floor or other hard surface. After the liquid hydrocarbon is absorbed into the polyisocyanurate foam of the composition, the composition is removed from the spill site such as by sweeping the composition into a dust pan. The liquid hydrocarbon-laden composition can then be disposed by conventional means such as by depositing in a landfill.

To illustrate the slip resistance imparted by the particulate material, liquid hydrocarbon absorbent compositions made in accordance with embodiments of the present invention were made with varying amounts of polyisocyanurate foam and cellular glass, and tested for slip resistance. The slip resistance was tested in accordance with ASTM F1679-96 using an English XL slip resistant tester. The results are shown below in Table 1.

TABLE 1

English XL Slip Resistance Tester Readings

| | Dry | Greasy | Oily |
|---|---|---|---|
| GLAZED TILE WITHOUT ABSORBENT GRANULES | | | |
| | .94 | off-scale low | off-scale low |
| | .93 | | |
| WITH ABSORBENT GRANULES | | | |
| Foam/Glass Ratio 25/75 | | .41 | .20 |
| | | .42 | .20 |
| Foam/Glass Ratio 50/50 | | .43 | .21 |
| | | .39 | .20 |
| Foam/Glass Ratio 75/25 | | .18 | .20 |
| | | .18 | .21 |
| QUARRY TILE WITHOUT ABSORBENT GRANULES | | | |
| | .94 | .18 | .16 |
| | .94 | .15 | .18 |
| WITH ABSORBENT GRANULES | | | |
| Foam/Glass Ratio 25/75 | | .41 | .46 |
| | | .42 | .47 |
| Foam/Glass Ratio 50/50 | | .43 | .47 |
| | | .39 | .47 |
| Foam/Glass Ratio 75/25 | | .44 | .45 |
| | | .44 | .44 |

All tests used to generate the data in Table 1 were performed at about 75° F. and 75% relative humidity. Both red (unglazed) quarry tile and smooth, glazed pressed-dust tile were tested for slip resistance. Both type of tiles were first tested for slip resistance when dry, and then were tested for slip resistance when coated with grease (cooking shortening) and when coated with 10W–40 motor oil. A new slider pad was used for conducting the test and was it prepared by sanding with 400 grip paper as specified in the ASTM test standard. The pad was resanded between each test. The shortening and motor oil were applied to the tiles by dropping a quantity onto the surface of the tiles with a dip tube and then dragging a thin plywood squeegee across the surface of the tiles to provide a relatively uniform film thickness for each test stroke. The slip resistance of the tiles was tested with shortening only, oil only, and then with absorbent granules, made in accordance with the embodiments of the present invention, sprinkled over the tiles coated with shortening and with oil. Three different embodiments of the absorbent granular composition of the present invention were tested. The tested compositions had different ratios of polyisocyanurate foam to cellular glass. These ratios are set forth in Table 1 in terms of a ratio of percentage by weight of the composition. The ratios are shown as polyisocyanurate foam to glass.

The slip resistant tester was used in the usual manner to test the slip resistance of the tiles. After recording each result, the tile surface and the tester pad were prepared for the next test by wiping the surfaces clear, washing the surfaces with tile cleaner, and wiping the surfaces with a paper towel. Two testing meter readings were taken for each test. Readings were taken in two opposing directions.

As can be seen from the data in Table 1, traction performance of the tiles was greatly improved by application of the absorbent granules. The slip resistance testing meter readings are set forth in one-hundredths. The lower the meter reading, the more slippery the surface. The dry tiles, as expected, showed very high slip resistance readings of 0.93 and 0.94. The greasy and oily tiles without absorbent granules were very slippery. The glazed tiles with the grease and with oil had very low slip resistance readings which were off-scale. This means they were approaching zero. The slip resistance readings for the quarry tile with grease and with oil, but without absorbent granules were very low, ranging from 0.15 to 0.18. The addition of absorbent granules significantly increased the slip resistance of the tiles coated with grease and with oil.

It should be understood that the foregoing relates to particular embodiments of the present invention, and that numerous changes may be made therein without departing from the scope of the invention as defined by the following claims.

I claim:

1. Composition for removing liquid hydrocarbon from floors and other hard surfaces comprising:
   absorbent granular polyisocyanurate foam having a first bulk density for absorbing the liquid hydrocarbon; and
   a particulate abrasive material having a second bulk density greater than the first bulk density for imparting slip-resistance to the floor or hard surface, wherein the granular polyisocyanurate foam and the particulate abrasive material are blended together to form a mixture.

2. Composition as in claim 1 wherein the particulate material is oleophillic.

3. Composition as in claim 1 wherein the particulate material has an angular surface.

4. Composition as in claim 1 wherein the particulate material is sand.

5. Composition as in claim 4 wherein the sand is angular sand.

6. Composition as in claim 1 wherein the particulate material is granular glass.

7. Composition as in claim 6 wherein the granular glass is cellular glass.

8. Composition as in claim 7 wherein the cellular glass is comminuted.

9. Composition as in claim 8 wherein the cellular glass has a particle size such that the cellular glass passes through a 30 mesh screen.

10. Composition as in claim 9 wherein the polyisocyanurate foam has a particle size such that the polyisocyanurate foam passes through a 16 mesh screen.

11. Composition as in claim 1 wherein the polyisocyanurate foam is present in an amount from about 25 to about 75% by weight of the composition and the particulate material is present in an amount from about 75 to about 25% by weight of the composition.

12. Composition as in claim 11 wherein the polyisocyanurate foam has a particle size such that the polyisocyanurate foam passes through a 16 mesh screen and the particulate material is comminuted cellular glass having a particle size such that the cellular glass passes through a 30 mesh screen.

13. Composition as in claim 8 wherein the first bulk density is within the range from about 0.5 to about 4.0 lbs/ft$^3$ and the second bulk density is within the range from about 30 to about 50 lbs/ft$^3$.

14. Composition as in claim 12 wherein the first bulk density is within the range from about 0.5 to about 4.0 lbs/ft$^3$ and the second bulk density is within the range from about 30 to about 50 lbs/ft$^3$.

\* \* \* \* \*